US012086048B2

(12) United States Patent
Ray et al.

(10) Patent No.: US 12,086,048 B2
(45) Date of Patent: Sep. 10, 2024

(54) METHOD AND APPARATUS FOR GENERATING AN ARCHITECTURE WEIGHTED SCORING MODEL

(71) Applicant: JPMorgan Chase Bank, N.A., New York, NY (US)

(72) Inventors: Rajat Ray, Singapore (SG); Navnidh Bhalla, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 490 days.

(21) Appl. No.: 17/444,114

(22) Filed: Jul. 30, 2021

(65) Prior Publication Data

US 2022/0075703 A1 Mar. 10, 2022

Related U.S. Application Data

(60) Provisional application No. 63/075,988, filed on Sep. 9, 2020.

(51) Int. Cl.
G06F 16/90 (2019.01)
G06F 8/60 (2018.01)
G06F 11/34 (2006.01)
G06N 5/01 (2023.01)

(52) U.S. Cl.
CPC ............ *G06F 11/3442* (2013.01); *G06F 8/60* (2013.01); *G06N 5/01* (2023.01)

(58) Field of Classification Search
CPC .......... G06F 11/3442; G06F 8/60; G06N 5/01
See application file for complete search history.

(56) References Cited

U.S. PATENT DOCUMENTS

| | | | | |
|---|---|---|---|---|
| 2005/0060662 A1* | 3/2005 | Soares | ............... | G06Q 10/06 715/810 |
| 2010/0138443 A1* | 6/2010 | Ramakrishnan | .. | G06F 16/90324 707/769 |
| 2010/0312737 A1* | 12/2010 | Coldicott | ............... | G06F 16/21 706/45 |
| 2011/0145279 A1* | 6/2011 | Chunilal | ............... | G06F 8/61 707/769 |
| 2016/0162611 A1* | 6/2016 | Mardikar | ............... | G06Q 10/10 703/22 |

(Continued)

*Primary Examiner* — Hosain T Alam
*Assistant Examiner* — Robert F May
(74) *Attorney, Agent, or Firm* — GREENBLUM & BERNSTEIN, P.L.C.

(57) ABSTRACT

Various methods, apparatuses/systems, and media for generating an architecture weighted scoring model are disclosed. A receiver receives a request from a user computing device to develop an application. A GUI displays a set of questions that are designed to gather meaningful information about the application to be developed by the user. A processor receives user input data on each answer to the set of questions; selects an architecture type by utilizing a first decision tree running on backend of a GUI; generates a second decision tree to select architecture layers; and generates a third decision tree to select product offerings; calculates a score for the selected architecture type based on analyzing aggregated information collected from data generated in response to user's answers and corresponding user's selection of each decision tree; checks that the architecture works; and generates an architecture weighted scoring model (AWSM) based on the calculated score.

15 Claims, 11 Drawing Sheets

(56) References Cited

U.S. PATENT DOCUMENTS

| | | | |
|---|---|---|---|
| 2017/0024290 A1* | 1/2017 | Kaulgud | G06F 8/60 |
| 2017/0357812 A1* | 12/2017 | Lerner | G06N 20/00 |
| 2019/0171948 A1* | 6/2019 | Pillai | G06F 11/3006 |
| 2021/0081819 A1* | 3/2021 | Polleri | G06N 5/022 |
| 2022/0058531 A1* | 2/2022 | Ding | G06N 20/00 |
| 2023/0120379 A1* | 4/2023 | Nassar | G06F 3/0482 |
| | | | 709/204 |

\* cited by examiner

| Chosen Architecture 702a | Expected Layers 704a |
|---|---|
| Traditional Client-Server Architecture | Presentation Layer, the Application Layer and the Data Layer |
| API-Driven Server Architecture | Security Layer, Caching Layer, Representation Layer, Orchestration Layer |
| ... | ... |

| Comparison Category | Product A (Most Recommended) 704b | Product B (Least Recommended) 706b |
|---|---|---|
| Description | Product A is a relational database. This means that the data it contains is interlinked in some shape or form. | Product B is a relational database. This means that the data it contains is interlinked in some shape or form. |
| Product Lifecycle | Currently in new state. Hence, this database will be available throughout your product lifecycle. | Currently in old state. Hence, this database may NOT be available throughout your product lifecycle (unless the strategic state is renewed). |
| Expected Cost Per Month | USD$100 | USD$125 |
| Expected Overall Cost for Product Lifecycle | USD$6000 | USD$7500 |
| Additional Support Costs (If Needed) | USD$500 (24 Hour Dedicated Support) | USD$450 (24 Hour Dedicated Support) |
| Notable Pros & Cons | (+) Encryption services available<br>(+) Unlimited memory<br>(-) Performance issues with scale | (+) Strong technical support and documentation<br>(+) Custom data types supported<br>(-) Resource-intensive |
| Common Use Cases | Generally used for data analysis, automation and warehousing. | Generally used for products built around the Microsoft ecosystem. |
| Other Products Using This Offering | Product X, Y, Z | Product J, K |
| ... | ... | ... |

METHOD AND APPARATUS FOR GENERATING AN ARCHITECTURE WEIGHTED SCORING MODEL

CROSS-REFERENCE TO RELATED APPLICATIONS

This application claims the benefit of priority from U.S. Provisional Patent Application No. 63/075,988, filed Sep. 9, 2020, which is herein incorporated by reference in its entirety.

TECHNICAL FIELD

This disclosure generally relates to software architecture, and, more particularly, to methods and apparatuses for generating an architecture weighted scoring model that allows product/software/application owners to choose the right architecture and the right underlying software components based on their use case and financial budget, thereby improving efficiency, quality, and productivity in designing and developing an application.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, when a new application is commissioned, product/software/application owners often struggle to choose the most appropriate software architecture for their product. This may be attributed to several reasons, with the most common being the lack of understanding of the use cases of various software architecture patterns. Even if the product/software/application owner has clarity about the overall architecture, he/she may not be familiar with the pros and cons of all the competing product offerings for each underlying layer of the software architecture (e.g., the database layer, the presentation layer, etc.), making it difficult to map out clear top-down requirements for the product. Furthermore, the rapidly evolving technology landscape requires product/software/application owners to constantly update their architectures (for example when there is a change in corporate strategy, the design of underlying components, the agreed upon conventions for an architecture pattern, the expected product support cycles and so on). However, usually, product/software/application owners do not proactively address these issues, thereby resulting in outdated and stale architectures.

From a technical standpoint, without having adequate knowledge to effectively choose/update a software architecture and its underlying components, there appears to be a high chance that the final product does not follow software best practices and design patterns, thereby resulting negative repercussions on key software quality attributes, e.g., optimality, reliability, security, maintainability etc. From a business standpoint, due to the lack of a distinctly defined up-to-date architecture, it may prove to be extremely difficult to accurately forecast the operational costs (e.g., licensing fees, hosting charges, support subscriptions, etc.) and the potential one-off costs (e.g., dedicated service engagement, unforeseen upgrading/patching costs, etc.) of a product. This can result in under-budgeting and over-budgeting, both of which may be detrimental to an organization's financial health in the long run.

In addition, certain products may undergo compliance/regulatory checks before they are given the green light to start development. For such products, it may be imperative to have a well-defined and well-understood software architecture model right from the beginning of the development cycle. Furthermore, product/software/application owners may decide to use non-strategic underlying components that may not be supported throughout the entire product lifecycle. This may cause service disruption to users at some point in the future because the product/software/application owners may have to upgrade or change the underlying components so that they adhere to the company's strategic software direction. This can be avoided altogether if the product/software/application owners have a clear top-down picture of their software architecture and the underlying components right from the start.

SUMMARY

The present disclosure, through one or more of its various aspects, embodiments, and/or specific features or sub-components, may provide, among others, various systems, servers, devices, methods, media, programs, and platforms for generating an architecture weighted scoring model (AWSM) that allows product/software/application owners to choose the right architecture and the right underlying software components based on their use case and financial budget, thereby improving efficiency, quality, and productivity in designing and developing an application, but the disclosure is not limited thereto.

According to an aspect of the present disclosure, a method for generating an architecture weighted scoring model by utilizing one or more processors and one or more memories is disclosed. The method may include: receiving a request from a user computing device to develop an application; displaying a set of questions onto a graphical user interface (GUI) based on the received request, wherein the questions are designed to gather meaningful information about the application to be developed by the user; receiving user input data on each answer to the set of questions; determining and selecting an architecture type suitable for developing the application by utilizing a first decision tree running on backend on the GUI based on the received user input data; generating a second decision tree based on the user's selected architecture type, wherein the second decision tree constitutes a list of selectable common underlying architecture layers corresponding to the selected architecture type; generating a third decision tree based on the user's selected architecture layers, wherein the third decision tree constitutes a curated list of selectable product offerings for each of the architecture layers; calculating a score for the selected architecture type based on analyzing aggregated information collected from data generated in response to user's answers and corresponding user's selection of each decision tree; running a checking algorithm to ensure that the selected architecture works; and generating an architecture weighted scoring model (AWSM) based on the calculated score and a positive checking result.

According to another aspect of the present disclosure, the AWSM may include details of different scores and their contributing factors in developing the application, but the disclosure is not limited thereto.

According to yet another aspect of the present disclosure, the method may further include: calculating a base score value for the selected architecture type, wherein the base score value includes an application type value and a deployment strategy value, wherein the application type value is determined based on the user's inputs and the user's design considerations, and wherein the deployment strategy value is determined either explicitly by the user, or implicitly by the decision trees.

According to an aspect of the present disclosure, the method may further include: calculating a technology score value, wherein the technology score value includes cross cutting concerns values and appropriate technology value, wherein the cross cutting concerns values are utilized to determine whether the selected architecture type adheres to organizational standards/conventions, and wherein the appropriate technology value constitutes a measure of whether or not the selected architecture type and its underlying layers and product offerings can sustain throughout an expected product lifecycle.

According to further aspect of the present disclosure, the method may further include: calculating a quality score value which aggregates service quality attribute scores for the selected architecture type, its underlying layers, and all underlying products or components.

According to yet another aspect of the present disclosure, the method may further include: assigning corresponding weightage value to each of the base score value, the technology score value, and the quality score value; calculating an overall score value by combining the weightage value of each of the base score value, the technology score value, and the quality score value; and generating the architecture weighted scoring model (AWSM) based on the calculated overall score value.

According to an aspect of the present disclosure, the method may further include: approving the application when it is determined that the overall score value is equal to or more than a predefined threshold value.

According to another aspect of the present disclosure, the method may further include: denying approval of the application when it is determined that the overall score value is less than a predefined threshold value; and automatically prompting an electronic notification on the GUI to review the selected architecture type again and/or setting up a meeting with an architecture consultant.

According to yet another aspect of the present disclosure, a system for generating an architecture weighted scoring model is disclosed. The system may include a receiver that receives a request from a user computing device to develop an application, and a processor operatively connected to the receiver via a communication network. The processor may be configured to: cause a graphical user interface (GUI) of the user computing device to display a set of questions based on the received request, wherein the questions are designed to gather meaningful information about the application to be developed by the user; receive user input data on each answer to the set of questions; determine and select an architecture type suitable for developing the application by utilizing a first decision tree running on backend on the GUI based on the received user input data; generate a second decision tree based on the user's selected architecture type, wherein the second decision tree constitutes a list of selectable common underlying architecture layers corresponding to the selected architecture type; generate a third decision tree based on the user's selected architecture layers, wherein the third decision tree constitutes a curated list of selectable product offerings for each of the architecture layers; calculate a score for the selected architecture type based on analyzing aggregated information collected from data generated in response to user's answers and corresponding user's selection of each decision tree; run a checking algorithm to ensure that the selected architecture works; and generate an architecture weighted scoring model (AWSM) based on the calculated score and a positive checking result.

According to a further aspect of the present disclosure, the processor may be further configured to: calculate a base score value for the selected architecture type, wherein the base score value includes an application type value and a deployment strategy value, wherein the application type value is determined based on the user's inputs and the user's design considerations, and wherein the deployment strategy value is determined either explicitly by the user, or implicitly by the decision trees.

According to an aspect of the present disclosure, the processor may be further configured to: calculate a technology score value, wherein the technology score value includes cross cutting concerns values and appropriate technology value, wherein the cross cutting concerns values are utilized to determine whether the selected architecture type adheres to organizational standards/conventions, and wherein the appropriate technology value constitutes a measure of whether or not the selected architecture type and its underlying layers and product offerings can sustain throughout an expected product lifecycle.

According to further aspect of the present disclosure, the processor may be further configured to: calculate a quality score value which aggregates service quality attribute scores for the selected architecture type, its underlying layers, and all underlying products or components.

According to yet another aspect of the present disclosure, the processor may be further configured to: assign corresponding weightage value to each of the base score value, the technology score value, and the quality score value; calculate an overall score value by combining the weightage value of each of the base score value, the technology score value, and the quality score value; and generate the architecture weighted scoring model (AWSM) based on the calculated overall score value.

According to an aspect of the present disclosure, the processor may be further configured to: approve the application when it is determined that the overall score value is equal to or more than a predefined threshold value.

According to another aspect of the present disclosure, the processor may be further configured to: deny approval of the application when it is determined that the overall score value is less than a predefined threshold value; and automatically prompt an electronic notification on the GUI to review the selected architecture type again and/or setting up a meeting with an architecture consultant.

According to a further aspect of the present disclosure, a non-transitory computer readable medium configured to store instructions for generating an architecture weighted scoring model is disclosed. The instructions, when executed, may cause a processor to perform the following: causing a receiver to receive a request from a user computing device to develop an application; causing a graphical user interface (GUI) to display a set of questions based on the received request, wherein the questions are designed to gather meaningful information about the application to be developed by the user; receiving user input data on each answer to the set of questions; determining and selecting an architecture type suitable for developing the application by utilizing a first decision tree running on backend on the GUI based on the received user input data; generating a second decision tree based on the user's selected architecture type, wherein the second decision tree constitutes a list of selectable common underlying architecture layers corresponding to the selected architecture type; generating a third decision tree based on the user's selected architecture layers, wherein the third decision tree constitutes a curated list of selectable product offerings for each of the architecture layers; calculating a score for the selected architecture type based on analyzing aggregated information collected from data generated in response to user's answers and corresponding user's selection of each decision tree; running a checking algorithm to ensure that the selected architecture works; and generating an architecture weighted scoring model (AWSM) based on the calculated score and a positive checking result.

According to yet another aspect of the present disclosure, the instructions, when executed, may cause the processor to perform the following: calculating a base score value for the selected architecture type, wherein the base score value includes an application type value and a deployment strategy value, wherein the application type value is determined based on the user's inputs and the user's design considerations, and wherein the deployment strategy value is determined either explicitly by the user, or implicitly by the decision trees.

According to an aspect of the present disclosure, the instructions, when executed, may cause the processor to perform the following: calculating a technology score value, wherein the technology score value includes cross cutting concerns values and appropriate technology value, wherein the cross cutting concerns values are utilized to determine whether the selected architecture type adheres to organizational standards/conventions, and wherein the appropriate technology value constitutes a measure of whether or not the selected architecture type and its underlying layers and product offerings can sustain throughout an expected product lifecycle.

According to further aspect of the present disclosure, the instructions, when executed, may cause the processor to perform the following: calculating a quality score value which aggregates service quality attribute scores for the selected architecture type, its underlying layers, and all underlying products or components.

According to yet another aspect of the present disclosure, the instructions, when executed, may cause the processor to perform the following: assigning corresponding weightage value to each of the base score value, the technology score value, and the quality score value; calculating an overall score value by combining the weightage value of each of the base score value, the technology score value, and the quality score value; and generating the architecture weighted scoring model (AWSM) based on the calculated overall score value.

According to an aspect of the present disclosure, the instructions, when executed, may cause the processor to perform the following: approving the application when it is determined that the overall score value is equal to or more than a predefined threshold value.

According to another aspect of the present disclosure, the instructions, when executed, may cause the processor to perform the following: denying approval of the application when it is determined that the overall score value is less than a predefined threshold value; and automatically prompting an electronic notification on the GUI to review the selected architecture type again and/or setting up a meeting with an architecture consultant.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7A illustrates an exemplary second decision tree in a table format in accordance with an exemplary embodiment.

FIG. 7B illustrates an exemplary third decision tree in a table format in accordance with an exemplary embodiment.

DETAILED DESCRIPTION

Figure 1:
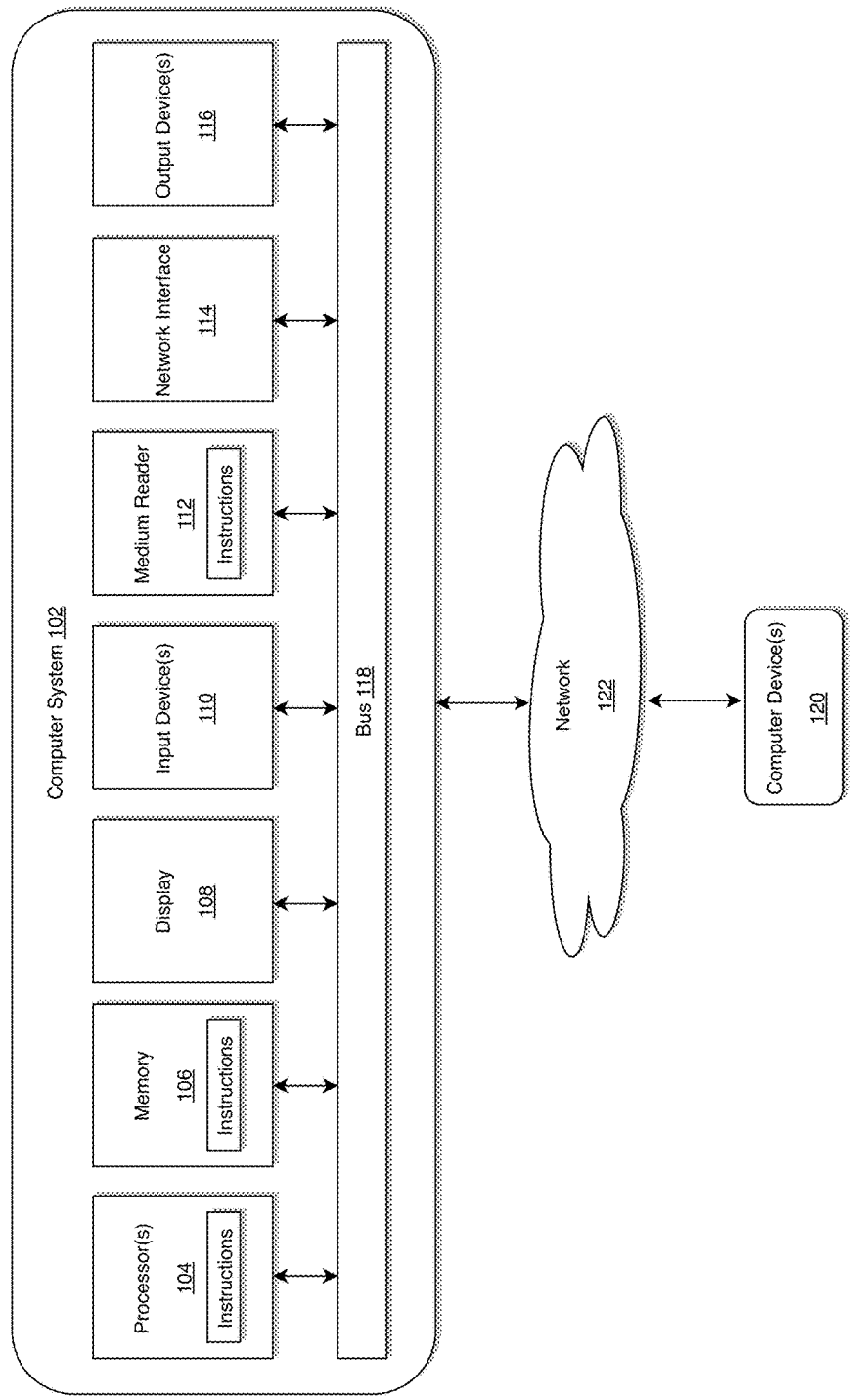
FIG. 1 illustrates a computer system for generating an architecture weighted scoring model in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines, tools, devices and/or modules. Those skilled in the art will appreciate that these blocks, units, engines, tools, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, tools, devices, and/or modules being implemented by microprocessors or similar, they may be programmed using software (e.g., microcode) to perform various functions discussed herein and may optionally be driven by firmware and/or software. Alternatively, each block, unit, engine, tool device, and/or module may be implemented by dedicated hardware, or as a combination of dedicated hardware to perform some functions and a processor (e.g., one or more programmed microprocessors and associated circuitry) to perform other functions. Also, each block, unit, engine, tool, device, and/or module of the example embodiments may be physically separated into two or more interacting and discrete blocks, units, engines, tools, devices, and/or modules without departing from the scope of the inventive concepts. Further, the blocks, units, engines, tools, devices, and/or modules of the example embodiments may be physically combined into more complex blocks, units, engines, tools, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing an architecture weighted scoring model (AWSM) that allows product/software/application owners to choose the right architecture and the right underlying software components based on their use case and financial budget, thereby improving efficiency, quality, and productivity in designing and developing an application, but the disclosure is not limited thereto.

Figure 2:
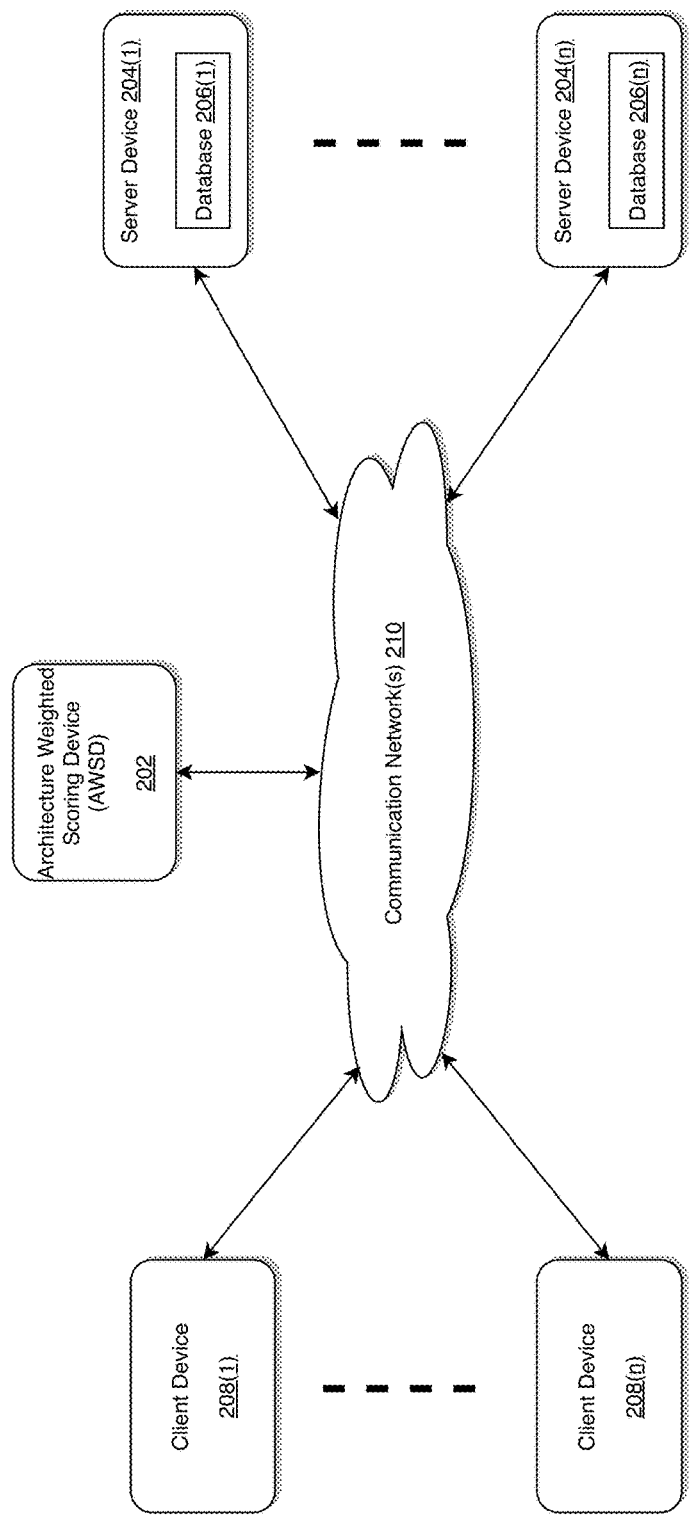
FIG. 2 illustrates an exemplary network diagram of an architecture weighted scoring model generating device in accordance with an exemplary embodiment.

Referring to FIG. 2, a schematic of an exemplary network environment 200 for implementing an architecture weighted scoring model generating device (AWSMGD) of the instant disclosure is illustrated.

According to exemplary embodiments, the above-described problems associated with conventional system may be overcome by implementing an AWSMGD 202 as illustrated in FIG. 2 to generate an architecture weighted scoring model that allows product/software/application owners to choose the right architecture and the right underlying software components based on their use case and financial budget, thereby improving efficiency, quality, and productivity in designing and developing an application, but the disclosure is not limited thereto. According to exemplary embodiments, the AWSMGD 202 may be configured to develop an application (Web-based offering)/service (API-based offering) that may allow the product/software/application owners in choosing the right architecture and the right underlying software components based on their use case and financial budget. According to exemplary embodiments, words like application, product, and software may be used interchangeably but ultimately may refer to the same thing.

The AWSMGD 202 may be the same or similar to the computer system 102 as described with respect to FIG. 1.

The AWSMGD 202 may store one or more applications that can include executable instructions that, when executed by the AWSMGD 202, cause the AWSMGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AWSMGD 202 itself, may be located in virtual server(s) running in a cloud-based computing environment rather than being tied to one or more specific physical network computing devices. Also, the application(s) may be running in one or more virtual machines (VMs) executing on the AWSMGD 202. Additionally, in one or more embodiments of this technology, virtual machine(s) running on the AWSMGD 202 may be managed or supervised by a hypervisor.

In the network environment 200 of FIG. 2, the AWSMGD 202 is coupled to a plurality of server devices 204(1)-204(n) that hosts a plurality of databases 206(1)-206(n), and also to a plurality of client devices 208(1)-208(n) via communication network(s) 210. A communication interface of the AWSMGD 202, such as the network interface 114 of the computer system 102 of FIG. 1, operatively couples and communicates between the AWSMGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AWSMGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AWSMGD 202 may be a standalone device or integrated with one or more other devices or apparatuses, such as one or more of the server devices 204(1)-204(n), for example. In one particular example, the AWSMGD 202 may be hosted by one of the server devices 204(1)-204(n), and other arrangements are also possible. Moreover, one or more of the devices of the AWSMGD 202 may be hosted in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AWSMGD 202 via the communication network(s) 210 according to the HTTP-based protocol and/or JavaScript Object Notation (JSON) based file format, for example, although other protocols/file format may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the AWSMGD 202 that may provide a way to figuring out any changes to a project which might break any existing API consumers in an automated way, but the disclosure is not limited thereto.

Accordingly, the client devices 208(1)-208(n) may be mobile computing devices, desktop computing devices, laptop computing devices, tablet computing devices, virtual machines (including cloud-based computers), for example.

The client devices 208(1)-208(n) may run interface applications, such as standard web browsers or standalone client applications, which may provide an interface to communicate with the AWSMGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the AWSMGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AWSMGD 202, the server devices 204(1)-204(n), or the client devices 208(1)-208(n), for example, may be configured to operate as virtual instances on the same physical machine. For example, one or more of the AWSMGD 202, the server devices 204(1)-204(n), or the client devices 208(1)-208(n) may operate on the same physical device rather than as separate devices communicating through communication network(s) 210.

Additionally, there may be more or fewer AWSMGD 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic networks, cellular traffic networks, Packet Data Networks (PDNs), the Internet, intranets, and combinations thereof.

Figure 3:
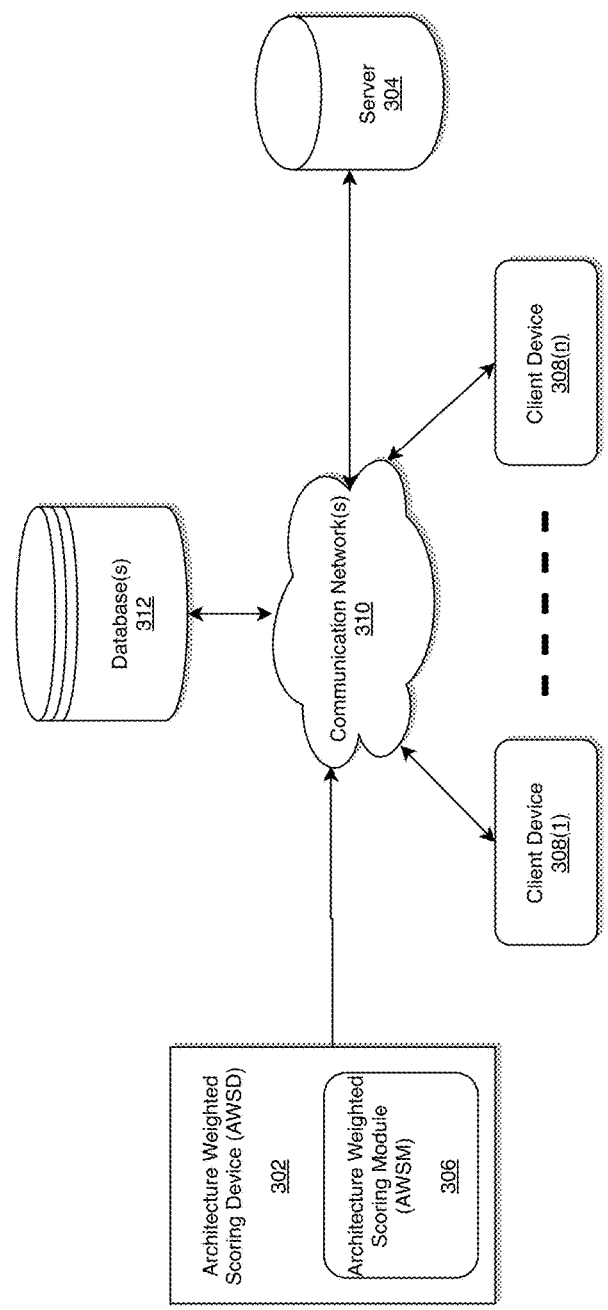
FIG. 3 illustrates a system diagram for implementing an architecture weighted scoring model generating device with an architecture weighted scoring model generating module in accordance with an exemplary embodiment.
Figure 4:
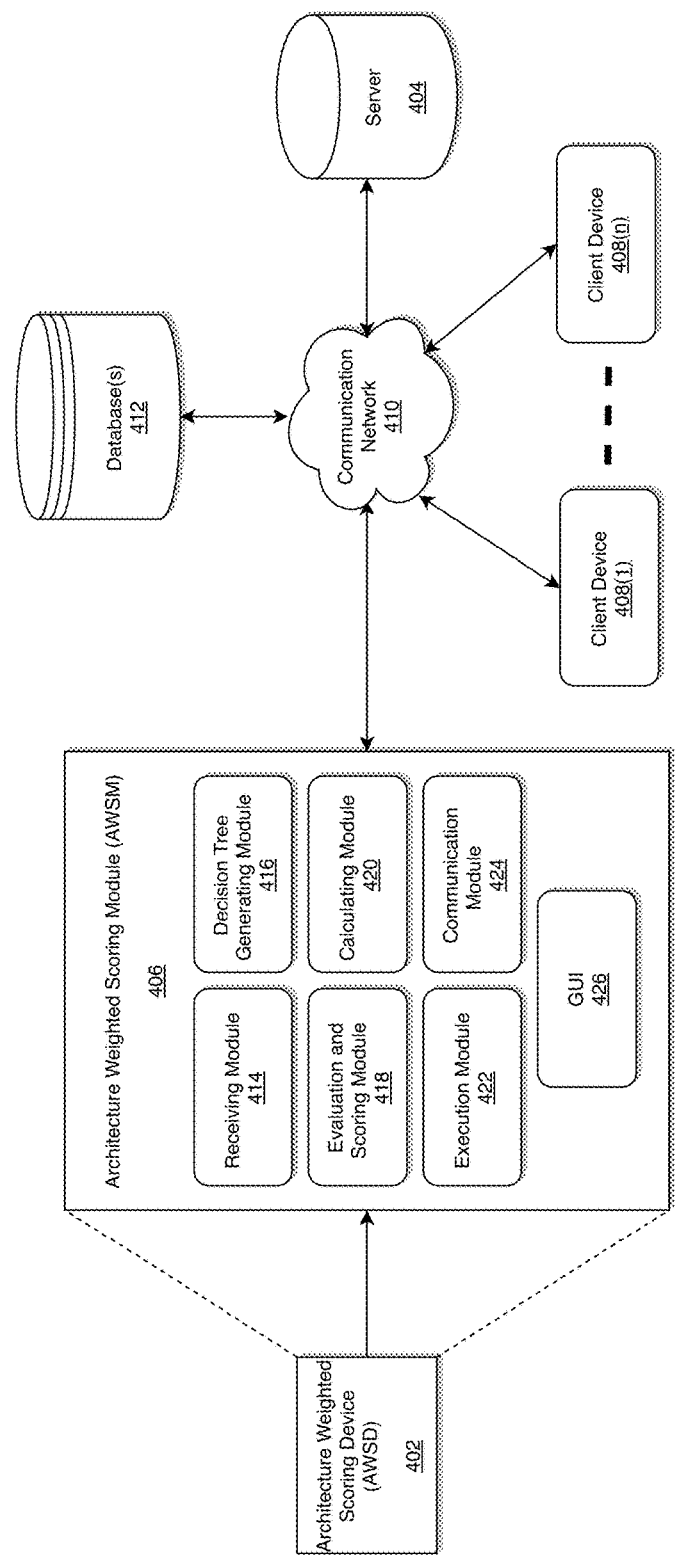
FIG. 4 illustrates a system diagram for implementing the architecture weighted scoring model generating module of FIG. 3 in accordance with an exemplary embodiment.

FIG. 3 illustrates a system diagram for implementing an architecture weighted scoring model generating device (AWSMGD) with an architecture weighted scoring model generating module (AWSMGM) in accordance with an exemplary embodiment. According to exemplary embodiments, the AWSMGM may be implemented locally and the local AWSMGM may include tools/module to generate the architecture weighted scoring model (AWSM) as illustrated in FIG. 4.

As illustrated in FIG. 3, in the system 300, according to exemplary embodiments, the AWSMGD 302 along with the AWSMGM 306 may be connected to a server 304 and database(s) 312 via a communication network 310, but the disclosure is not limited thereto. For example, according to exemplary embodiments, the AWSMGD 302 may be connected to any desired databases besides the server 304 and the database(s) 312.

According to exemplary embodiments, the server 304 and the database(s) 312 may include memories that may store information and metadata associated with generation of the AWSM, but the disclosure is not limited thereto.

According to exemplary embodiment, the AWSMGD 302 may include other rules, policies, modules, databases, or applications, for example. According to exemplary embodiments, the server 304 may be configured to store information including the metadata, but the disclosure is not limited thereto. According to exemplary embodiments, AWSMGD 302 may contain multiple stages connecting to various other tools to perform the required processes.

According to exemplary embodiments, the AWSMGD 302 may be configured to receive continuous feed of data from the server 304 and the database(s) 312 via the communication network 310. According to exemplary embodiments, the AWSMGD 302 may also be configured to communicate with one or more client devices 308(1)-308(n) (e.g., user's computing devices) via the communication network 310, but the disclosure is not limited thereto. According to exemplary embodiments, the client devices 308(1)-308(n) may also be referred to as user's systems/devices.

As will be described below, the AWSMGM 306 may be configured to cause a receiver to receive a request from a user computing device (e.g., one or more of client devices 308(1)-308(n)) to develop an application; cause a graphical user interface (GUI) to display a set of questions based on the received request. According to exemplary embodiments, the questions may be designed to gather meaningful information about the application to be developed by the user. The AWSMGM 306 may also be configured to receive user input data on each answer to the set of questions; determining and selecting an architecture type suitable for developing the application by utilizing a first decision tree running on backend on the GUI based on the received user input data; generating a second decision tree based on the user's selected architecture type, wherein the second decision tree constitutes a list of selectable common underlying architecture layers corresponding to the selected architecture type; generating a third decision tree based on the user's selected architecture layers, wherein the third decision tree constitutes a curated list of selectable product offerings for each of the architecture layers; calculating a score for the selected architecture type based on analyzing aggregated information collected from data generated in response to user's answers and corresponding user's selection of each decision tree; running a checking algorithm to ensure that the selected architecture works; and generating an architecture weighted scoring model (AWSM) based on the calculated score and a positive checking result, but the disclosure is not limited thereto.

For example, according to exemplary embodiments, the AWSMGM 306 embedded within the AWSMGD 302 may be configured to solve the problems associated conventional processes of developing software application, but the disclosure is not limited thereto.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the client devices 308(1)-308(n) may communicate with the AWSMGD 302 along with the AWSMGM 306 via broadband or cellular communication. Of course, these embodiments are merely exemplary and are not limiting or exhaustive.

FIG. 4 illustrates a system diagram for implementing an architecture weighted scoring model generating module of FIG. 3 in accordance with an exemplary embodiment. As illustrated in FIG. 4, the system 400 may include an architecture weighted scoring model generating device (AWSMGD) 402 with an architecture weighted scoring model generating module (AWSMGM) 406 which may include tools/modules to implement the process of generating an AWSM. The AWSMGM 406 may be operationally connected to one or more client devices 408(1)-408(n), a server 404, and one or more database(s) 412 via a communication network 410.

As illustrated in FIG. 4, the AWSMGM 406 may include a receiving module 414, a decision tree generating module 416, an evaluation and scoring module 418, a calculating module 420, an execution module 422, a communication module 424, and a GUI 426. Although FIG. 4 illustrates that the GUI 426 is embedded within the AWSMGM 406, the disclosure is not limited thereto. For example, the GUI 426 may be also be embedded within each of the client device 408(1)-408(n). According to exemplary embodiments, the client devices 408(1)-408(n) may be the same or similar to the client devices 308(1)-308(n) as illustrated in FIG. 3, the server 404 may be the same or similar to the server 304 as illustrated in FIG. 3, the database(s) 412 may be the same or similar to the database(s) 312 as illustrated in FIG. 3, and the communication network 410 may be same or similar to the communication network 310 as illustrated in FIG. 3.

The process may be executed via the communication network 410 which may comprise plural networks as described above. For example, in an exemplary embodiment, the various components of the AWSMGM 406 may communicate with the various components of the database (s) 412, server 405, and the client devices 408(1)-408(n) via the communication module 424 and the communication network 410. Of course, these embodiments are merely exemplary and are not limiting or exhaustive.

According to exemplary embodiments, each of the receiving module 414, the decision tree generating module 416, the evaluation and scoring module 418, the calculating module 420, the execution module 422, and the communication module 424 may be implemented by microprocessors or similar, they may be programmed using software (e.g., microcode) to perform various functions discussed herein. Alternatively, each of the receiving module 414, the decision tree generating module 416, the evaluation and scoring module 418, the calculating module 420, the execution module 422, and the communication module 424 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the receiving module 414, the decision tree generating module 416, the evaluation and scoring module 418, the calculating module 420, the execution module 422, and the communication module 424 may be physically separated into two or more interacting and discrete blocks, units, engines, devices, and/or modules without departing from the scope of the inventive concepts.

Figure 5:
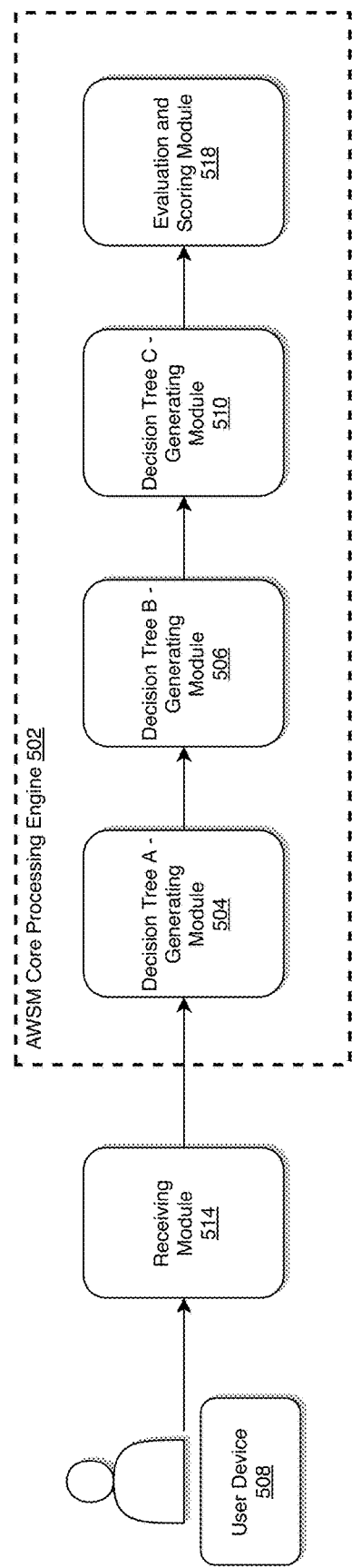
FIG. 5 illustrates an exemplary end-to-end flow diagram in generating the architecture weighted scoring model in accordance with an exemplary embodiment.
Figure 6:
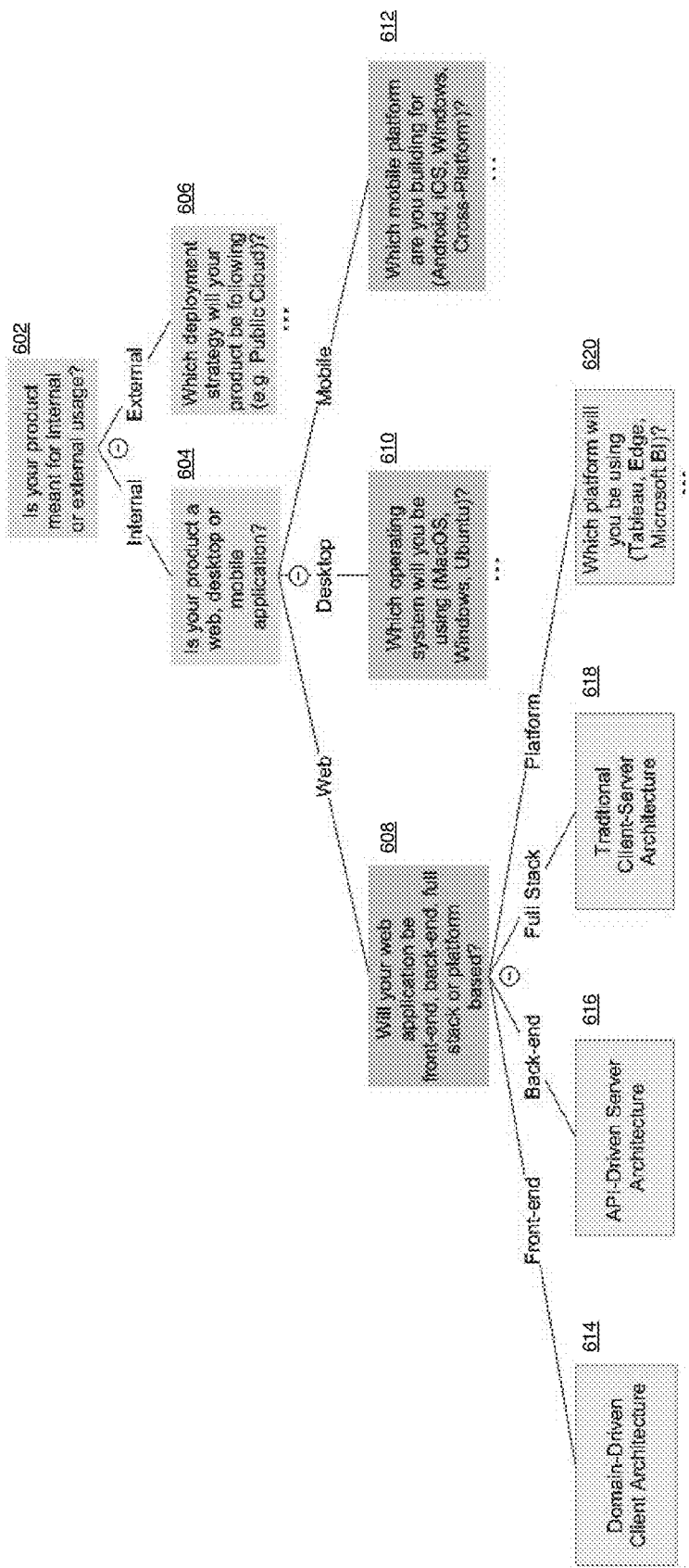
FIG. 6 illustrates an exemplary first decision tree in accordance with an exemplary embodiment.

FIG. 5 illustrates an exemplary end-to-end flow diagram in generating the architecture weighted scoring model in accordance with an exemplary embodiment. As illustrated in FIG. 5, the flow diagram 500 includes a user device 508, a receiving module 514, and an AWSM core processing engine 502 which includes a decision tree A generating module 504, a decision tree B generating module 506, a decision tree C generating module 510, and an evaluation and scoring module 518. FIG. 6 illustrates an exemplary first decision tree 600 (e.g., decision tree A generated by the decision tree A generating module 504) in accordance with an exemplary embodiment. FIG. 7A illustrates an exemplary second decision tree 700A in a table format (e.g., decision tree B generated by the decision tree B generating module 506) in accordance with an exemplary embodiment. FIG. 7B illustrates an exemplary third decision tree 700B in a table format (e.g., decision tree C generated by the decision tree C generating module 510) in accordance with an exemplary embodiment.

Figure 8:
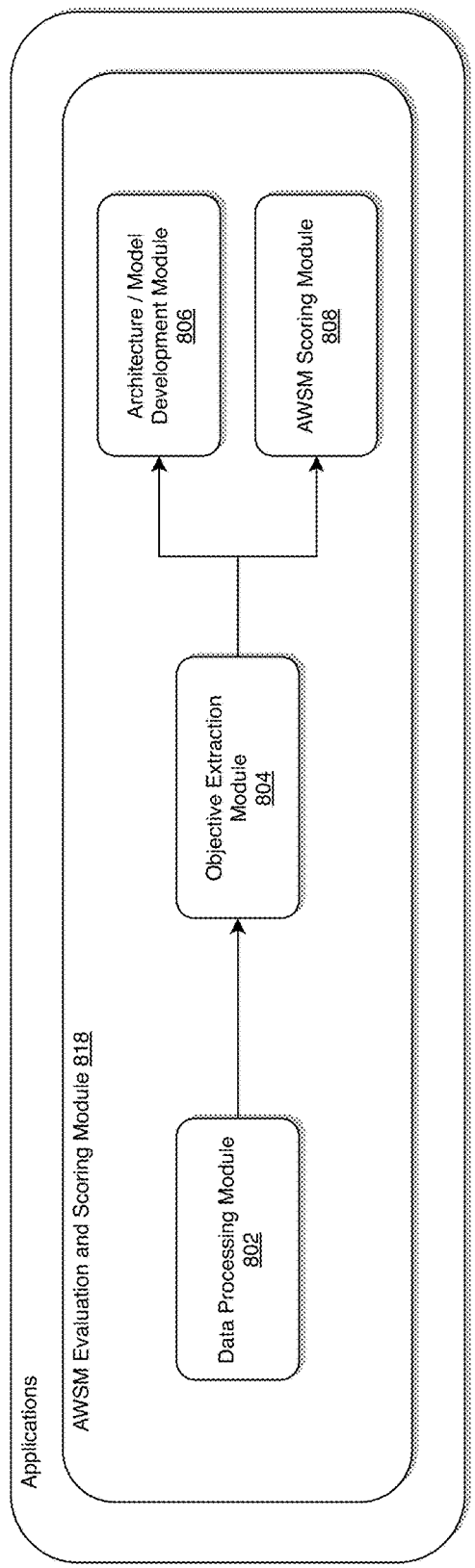
FIG. 8 illustrates an exemplary details of an evaluation and scoring module of FIG. 4 in accordance with an exemplary embodiment.

FIG. 8 illustrates an exemplary details of an evaluation and scoring module of FIGS. 4 and 5 in accordance with an exemplary embodiment. According to exemplary embodiments, as illustrated in FIG. 8, in the system 800, the AWSM evaluation and scoring module 818 may include a data processing module 802, an objective extraction module 804, an architecture/model development module 806, and an AWSM scoring module 808.

Referring to FIGS. 4-8, according to exemplary embodiments, the receiving module 414/514 may be configured to receive a request from a user computing device (e.g., one or more of the client devices 408(1)-408(n)) to develop an application. The execution module 422 may be configured to cause the GUI 426 of the user computing device (e.g., one or more of the client devices 408(1)-408(n) or the user device 508) to display a set of questions based on the received request. According to exemplary embodiment, the questions may be designed to gather meaningful information about the application to be developed by the user. For example, these questions may help to determine things like product budget, product lifecycle and type of product (e.g., web or mobile or desktop application, etc.). In the event that such data already exists in another system of record, the user can instead provide the URL or file containing application details, and the AWSMGM 406 may be configured to attempt to self-answer those questions as much as possible so as to minimize the number of questions posed to the user. The receiving module 414/514 may be configured to receive user input data on each answer to the set of questions.

According to exemplary embodiments, the decision tree generating module 416 (or the decision tree A generating module 504) may be configured to generate a first decision tree running on the backed on the GUI 426. According to exemplary embodiments, the first decision tree, running on the backend on the GUI 426, may be utilized by the user to determine and select an architecture type suitable for developing the application based on the received user input data, but the disclosure is not limited thereto.

FIG. 6 illustrates a sample diagram of decision tree A. It should be noted that this sample diagram for decision tree A is not exhaustive and that it is primarily meant to illustrate the logical flow that decision tree A will adopt. For example, the topmost node 602 of the decision tree A may include a question as to whether the user's requested product meant for internal or external usage. If the user inputs an answer at node 602 that the product is meant for internal usage, at leaf node 604, the user will be asked whether the product is a web, desktop or mobile application. If the user inputs an answer at node 602 that the product is meant for external usage, at leaf node 606, the user will be asked which deployment strategy the product will be following (e.g., public cloud?). Similarly, at leaf node 608, questions will be asked with respect to receiving user input in selection of web; at leaf node 610, questions will be asked with respect to receiving user input in selection of desktop; and at leaf node 608, questions will be asked with respect to receiving user input in selection of mobile.

For example, if the user selects web at leaf node 604, at leaf node 608, the user will be asked whether the web application will be front-end, back-end, full stack or platform based. If the user inputs an answer at leaf node 608 that the web application will be front-end based, at leaf node 614, the user will be prompt to select a domain-driven client architecture. If the user inputs an answer at leaf node 608 that the web application will be back-end based, at leaf node 616, the user will be prompt to select an API-driven server architecture. If the user inputs an answer at leaf node 608 that the web application will be full stack based, at leaf node 618, the user will be prompt to select a traditional client architecture. If the user inputs an answer at leaf node 608 that the web application will be platform based, at leaf node 620, the user will be prompt to answer which platform the user would like to utilize (e.g., Tableau, Edge, Microsoft BI, etc.?).

According to exemplary embodiments, as the technology landscape evolves, the AWSMGM 406 may be configured to include revised/newer architecture types as well. Regardless of the eventual number of supported architecture types, decision tree A may automatically shortlist the three most suitable ones (unless there is a 100% match, in which case only one will be suggested) and present them to the user for the final selection. This approach ensures that the user is not overloaded with information, and helps individuals who are not very tech savvy make strategic and informed decisions. In addition, supporting information, such as the common use cases of a particular architecture type and the problems that it solves, is also included in the shortlisted options to help users further.

According to exemplary embodiments, the decision tree generating module 416 (or the decision tree B generating module 506) may be configured generate a second decision tree (e.g., the decision tree B as illustrated in FIG. 7A as table format) based on the user's selected architecture type. The second decision tree may constitute a list of selectable common underlying architecture layers corresponding to the selected architecture type, but the disclosure is not limited thereto. For example, as illustrated in FIG. 7A, the decision tree 700A (table format) includes a column for chosen architecture 702a and a column for expected layers 704a. It should be noted that the decision tree 700A (table format) illustrates a sample mapping table depicting the correlation between the chosen architecture type and the expected layers. However, it should be noted that this table is not exhaustive and that it is primarily meant to illustrate the mapping that decision tree B may utilize.

Based on the user's selected architecture type, a corresponding list of common underlying architecture layers may be populated by decision tree B (see decision tree 700A in table format). For example, if a user selects the traditional client-server architecture, the corresponding architecture layers that will be populated by decision tree B are the presentation layer, the application layer and the data Layer. The logic behind which layers to recommend is underpinned by industry standards/conventions and agreed upon best practices and patterns for that particular architecture type. For instance, in the aforementioned client-server example, the commonly used three-tier architecture model has been referenced to make the above recommendation. At this juncture, the user will also be able to specify any additional architecture layers/components that may not traditionally be found in the base architecture model so as to create a customized hybrid model. They can also combine their architecture with pre-defined architectures within an organization to create an extended architecture model. While this may not be generally recommended (since the complexity increases), this functionality may be supported by AWSMGM 406 to cater to the gamut of use cases, foster further collaboration and promote organization-specific best practices.

According to exemplary embodiments, the decision tree generating module 416 (or the decision tree C generating module 510) may be configured generate a third decision tree (e.g., decision tree 700B as illustrated in FIG. 7B as table format) based on the user's selected architecture layers. The third decision tree constitutes a curated list of selectable product offerings for each of the architecture layers, but the disclosure is not limited thereto. For example, as illustrated in FIG. 7B, the decision tree 700B (table format) may include a column for comparison category 702b, a column for product A (most recommend) 704b, and a column for product B (least recommended) 706b. It should be noted that the decision tree 700B (table format) illustrates a sample comparison table for two database offerings based on a variety of important factors. However, it should be noted that this table is not exhaustive and that it is primarily meant to illustrate some of the factors that decision tree C may consider.

For example, once the architecture layers and additional components (if any) have been finalized, the user will move on to select specific products corresponding to each layer/component. This is where decision tree 700B may be utilized. Behind the scenes, decision tree C cleverly curates a list of product offerings for each of the layers/components, taking into account factors like product lifecycle, an organization's strategic direction and overall product budget to name a few. The decision tree C then ranks the top few available product offerings from most to least recommended and showcases them in a handy comparison table to help the user reach a reasoned verdict. Along with the above factors, the comparison table (decision tree 700B) may also include innate properties of the product like service quality attributes, common use cases etc. The decision tree 700B illustrates a hypothetical example table comparing two database offerings, but the disclosure is not limited thereto.

Referring to FIGS. 4 and 8, according to exemplary embodiments, the evaluation and scoring module 418/818 and the calculating module 420 may be configured to calculate a score for the selected architecture type based on analyzing aggregated information collected from data generated in response to user's answers and corresponding user's selection of each decision tree.

According to exemplary embodiments, evaluation and scoring module 418/818 may be configured to generate an architecture weighted scoring model (AWSM) based on the calculated score.

As the name suggests, the evaluation and scoring module 418/818 may serve two purposes (evaluation and scoring). However, before any of these purposes can be served, all information gathered from previous steps discussed above with respect to FIGS. 4-7B may need to be aggregated so as to provide a holistic view of the end-state architecture as selected by the user. This preparation may be performed by the data procession module 802 during the data processing stage of FIG. 8.

Once a holistic view has been established, according to exemplary embodiments, the evaluation and scoring module 418/818 may run checks to basically ensure that the architecture works. To do so, the evaluation and scoring module 418/818 proceeds to an objective extraction stage of FIG. 8 where the objective extraction module 804 intelligently determines whether or not all the underlying components (i.e., layers, products, and/or services, etc.) in the software architecture are actually compatible with one another. If not, the evaluation and scoring module 418/818 will prompt the user to choose an alternative offering to remove the identified friction point. According to exemplary embodiments, this functionality of checking may also be integrated with the previous steps so as to check on the fly. However, to prevent the constant checking, according to exemplary embodiments, the checking step is performed as a final validation step instead. This is because, at the final validation step, the system obtains perfect information and on the whole, this approach may be computationally more efficient.

Upon receiving the green light from the evaluation and scoring module 418/818, the end-state architecture is finalized (depicted as architecture/model development module 806 in FIG. 8) and the scoring engine takes over (depicted as AWSM scoring module 808 in FIG. 8).

Figure 9:
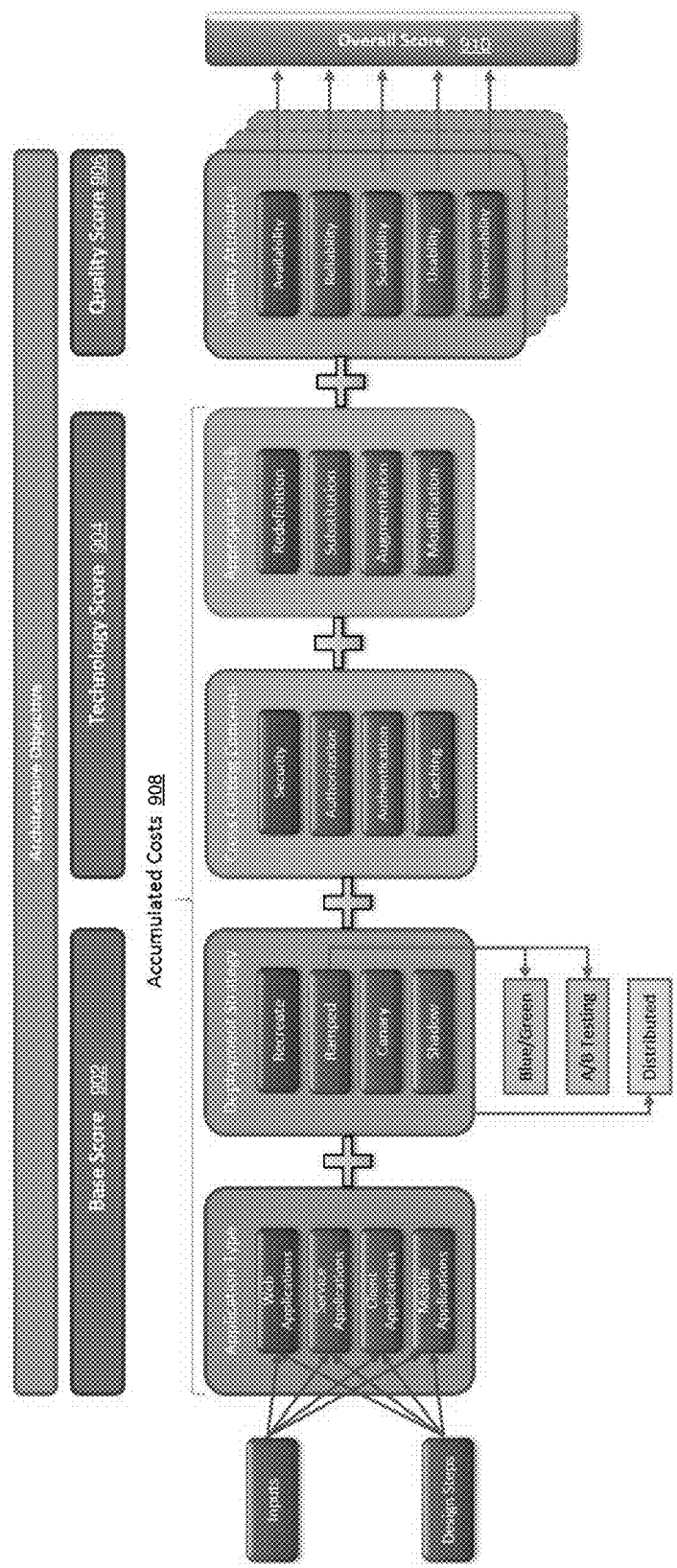
FIG. 9 illustrates an exemplary architecture weighted scoring model in accordance with an exemplary embodiment.

The AWSM scoring module 808 is configured to calculate a score for the architecture based on all the information it has been fed. FIG. 9 illustrates an exemplary architecture weighted scoring model 900 in accordance with an exemplary embodiment. More specifically, FIG. 9 depicts exemplary internal mechanisms of the AWSM scoring module 808. According to exemplary embodiments, FIG. 9 illustrates a final AWSM which details the different scores and their contributing factors, but the disclosure is not limited thereto. It should be noted that this diagram as illustrated in FIG. 9 is not exhaustive and that it is primarily meant to illustrate the main components that are utilized by the AWSM scoring module 808 of the evaluation and scoring module 418/818.

Referring to FIGS. 4, 8, and 9, according to exemplary embodiments, the calculating module 420 (or the AWSM scoring module 808) may be configured to calculate a base score value 902 for the selected architecture type. The base score value 902 may include an application type value and a deployment strategy value, wherein the application type value is determined based on the user's inputs and the user's design considerations, and wherein the deployment strategy value is determined either explicitly by the user, or implicitly by the decision trees, but the disclosure is not limited thereto.

According to exemplary embodiments, the calculating module 420 (or the AWSM scoring module 808) may be configured to calculate a technology score value 904. The technology score value 904 may include cross cutting concerns values and appropriate technology value, wherein the cross cutting concerns values are utilized to determine whether the selected architecture type adheres to organizational standards/conventions, and wherein the appropriate technology value constitutes a measure of whether or not the selected architecture type and its underlying layers and product offerings can sustain throughout an expected product lifecycle.

According to exemplary embodiments, the calculating module 420 (or the AWSM scoring module 808) may be configured to calculate a quality score value 906 which aggregates service quality attribute scores for the selected architecture type, its underlying layers, and all underlying products or components.

According to exemplary embodiments, AWSMGM 406 may be configured to assign corresponding weightage value to each of the base score value 902, the technology score value 904, and the quality score value 906; calculate an overall score value 910 by combining the weightage value of each of the base score value 902, the technology score value 904, and the quality score value 906; and generate the architecture weighted scoring model (AWSM) based on the calculated overall score value 910.

According to exemplary embodiments, AWSMGM 406 may be configured to approve the application when it is determined that the overall score value 910 is equal to or more than a predefined threshold value.

According to exemplary embodiments, AWSMGM 406 may be configured to deny approval of the application when it is determined that the overall score value is less than a predefined threshold value; and automatically prompt an electronic notification on the GUI 426 to review the selected architecture type again and/or setting up a meeting with an architecture consultant.

As illustrated in FIG. 9, the top-level consideration for the scoring engine is the overall architecture objective of an organization/team. According to exemplary embodiments, the eventual score assignment and weightage is determined in reference to this overall goal. Underneath this overarching objective are the three primary scoring categories (base score, technology score, and quality score) as disclosed above.

As the process moves from left to right in FIG. 9, and add up all the contributing factors to the base score value 902, the technology score value 904, and the quality score value 906, the AWSMGM 406 generates an insightful overall score value 910. In parallel, accumulated costs 908 are also summed up as the process moves from left to right. These costs do not factor into the scoring model since it may be difficult to accurately forecast them in the long run (e.g., pricing models may change, architecture requirements may evolve, unexpected costs may arise, etc.). However, they are still computed and displayed so that users can estimate likely costs and their ability to operate within a specified budget (if any).

According to exemplary embodiments, the aforementioned scoring categories can have weightages assigned to them based on an organization's priorities, but by default they will contribute equally to the overall score. Furthermore, an organization can set minimum scores for each category for more granular control, but by default this will not be enabled. The overall score can also be used for purposes like tollgate checks. For example, if the score falls below a predefined threshold, the application/software/product is denied approval and the user is prompted to review the end-state architecture again and/or set up a meeting with an architecture consultant. Conversely, if the overall score surpasses the predefined threshold value, the application/product is automatically approved without any manual intervention.

In addition, according to exemplary embodiments, every architecture model that clears the expected threshold may be saved in the AWSM. This presents the following benefits, but the disclosure is not limited thereto: (a) it allows AWSM to suggest architecture types/product offerings based on what other products with similar use cases are using/have used; (b) it allows users to extend their architectures by building off of previously defined architecture models; (c) it ensures that the AWSM provisioning team can keep track of who is using what; and (d) can send appropriate notifications and reminders. For example, the AWSMGM 406 may be configured to send appropriate notifications and reminders when an underlying product offering is no longer supported or when the architecture type has updated conventions and so on. Such proactive communication ensures that application owners are always kept updated and that their products evolve progressively over time.

By utilizing AWSM generated by the AWSMGM 406, users may be able to select appropriate architectures as they are guided through the process. At the same time, AWSM will help to ensure that product/application/software architectures are built sustainably by keeping in mind cost forecasts, organizational standards and technology best practices. Users are also encouraged to revisit and modify their saved architectures to keep up with changing requirements as well, and their new scores will reflect accordingly.

According to exemplary embodiments, the AWSMGM 406 may be further configured to auto-generate architecture diagrams for technical documentation purposes. It may allow users to download architecture-specific and language-specific code templates to accelerate their software development with various architectures.

Figure 10:
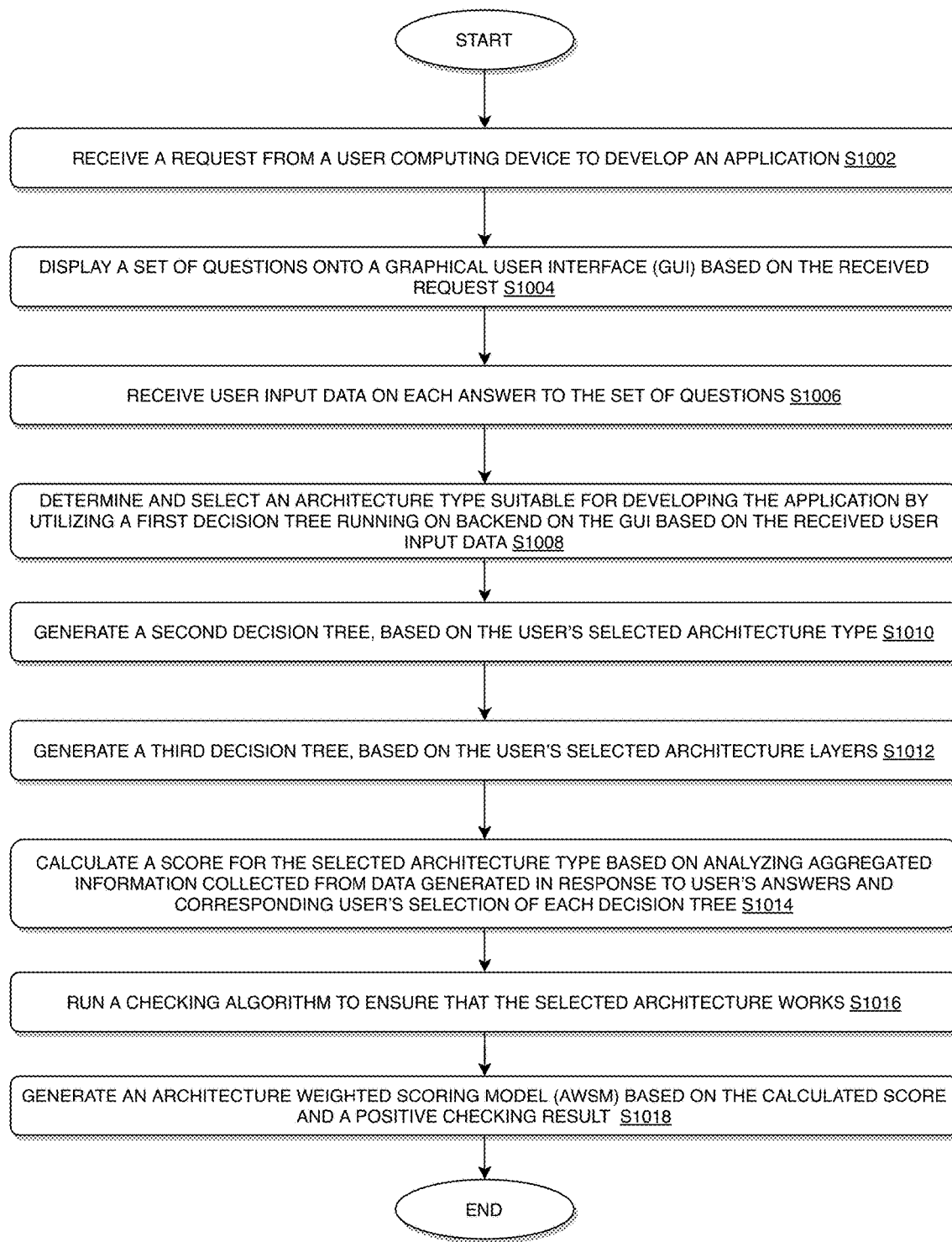
FIG. 10 illustrates a flow chart for generating an architecture weighted scoring model in accordance with an exemplary embodiment.

FIG. 10 illustrates a flow chart for generating an architecture weighted scoring model by utilizing one or more processors and one or more memories in accordance with an exemplary embodiment.

It will be appreciated that the illustrated process 1000 and associated steps may be performed in a different order, with illustrated steps omitted, with additional steps added, or with a combination of reordered, combined, omitted, or additional steps.

In the process 1000 of FIG. 10, at step S1002, a request may be received from a user computing device to develop an application. At step S1004, a set of questions may be displayed onto a graphical user interface (GUI) based on the received request, wherein the questions may be designed to gather meaningful information about the application to be developed by the user. At step S1006, user input data on each answer to the set of questions may be received.

According to exemplary embodiments, at step S1008, the process 1000 may automatically determine and select an architecture type suitable for developing the application by utilizing a first decision tree running on the backend on the GUI based on the received user input data.

At step S1010, the process 1000 may automatically generate a second decision tree based on the user's selected architecture type, wherein the second decision tree constitutes a list of selectable common underlying architecture layers corresponding to the selected architecture type.

At step S1012, the process 1000 may automatically generate a third decision tree based on the user's selected architecture layers, wherein the third decision tree constitutes a curated list of selectable product offerings for each of the architecture layers.

At step S1014, the process 1000 may automatically calculate a score for the selected architecture type based on analyzing aggregated information collected from data generated in response to user's answers and corresponding user's selection of each decision tree.

At step S1016, the process 1000 may run a checking algorithm to ensure that the selected architecture works.

At step S1018, the process 1000 may automatically generate an architecture weighted scoring model (AWSM) based on the calculated score and a positive checking result.

According to exemplary embodiments, the process 1000 may further include: calculating a base score value for the selected architecture type, wherein the base score value includes an application type value and a deployment strategy value, wherein the application type value is determined based on the user's inputs and the user's design considerations, and wherein the deployment strategy value is determined either explicitly by the user, or implicitly by the decision trees.

According to exemplary embodiments, the process 1000 may further include: calculating a technology score value, wherein the technology score value includes cross cutting concerns values and appropriate technology value, wherein the cross cutting concerns values are utilized to determine whether the selected architecture type adheres to organizational standards/conventions, and wherein the appropriate technology value constitutes a measure of whether or not the selected architecture type and its underlying layers and product offerings can sustain throughout an expected product lifecycle.

According to exemplary embodiments, the process 1000 may further include: calculating a quality score value which aggregates service quality attribute scores for the selected architecture type, its underlying layers, and all underlying products or components.

According to exemplary embodiments, the process 1000 may further include: assigning corresponding weightage value to each of the base score value, the technology score value, and the quality score value; calculating an overall score value by combining the weightage value of each of the base score value, the technology score value, and the quality score value; and generating the architecture weighted scoring model (AWSM) based on the calculated overall score value.

According to exemplary embodiments, the process 1000 may further include: approving the application when it is determined that the overall score value is equal to or more than a predefined threshold value.

According to exemplary embodiments, the process 1000 may further include: denying approval of the application when it is determined that the overall score value is less than a predefined threshold value; and automatically prompting an electronic notification on the GUI to review the selected architecture type again and/or setting up a meeting with an architecture consultant.

According to exemplary embodiments, a non-transitory computer readable medium may be configured to store instructions for generating an architecture weighted scoring model is disclosed. According to exemplary embodiments, the instructions, when executed, may cause a processor embedded within the AWSMGM 406 or the AWSMGD 402 to perform the following: causing a receiver to receive a request from a user computing device to develop an application; causing a graphical user interface (GUI) to display a set of questions based on the received request, wherein the questions are designed to gather meaningful information about the application to be developed by the user; receiving user input data on each answer to the set of questions; determining and selecting an architecture type suitable for developing the application by utilizing a first decision tree running on backend on the GUI based on the received user input data; generating a second decision tree based on the user's selected architecture type, wherein the second decision tree constitutes a list of selectable common underlying architecture layers corresponding to the selected architecture type; generating a third decision tree based on the user's selected architecture layers, wherein the third decision tree constitutes a curated list of selectable product offerings for each of the architecture layers; calculating a score for the selected architecture type based on analyzing aggregated information collected from data generated in response to user's answers and corresponding user's selection of each decision tree; running a checking algorithm to ensure that the selected architecture works; and generating an architecture weighted scoring model (AWSM) based on the calculated score and a positive checking result. The processor may be the same or similar to the processor 104 as illustrated in FIG. 1 or the processor embedded within AWSMGD 202, AWSMGD 302, AWSMGM 306, AWSMGD 402, and AWSMGM 406.

According to exemplary embodiments, the instructions, when executed, may cause the processor 104 embedded within the AWSMGM 406 or the AWSMGD 402 to perform the following: calculating a base score value for the selected architecture type, wherein the base score value includes an application type value and a deployment strategy value, wherein the application type value is determined based on the user's inputs and the user's design considerations, and wherein the deployment strategy value is determined either explicitly by the user, or implicitly by the decision trees.

According to exemplary embodiments, the instructions, when executed, may cause the processor 104 embedded within the AWSMGM 406 or the AWSMGD 402 to perform the following: calculating a technology score value, wherein the technology score value includes cross cutting concerns values and appropriate technology value, wherein the cross cutting concerns values are utilized to determine whether the selected architecture type adheres to organizational standards/conventions, and wherein the appropriate technology value constitutes a measure of whether or not the selected architecture type and its underlying layers and product offerings can sustain throughout an expected product lifecycle.

According to exemplary embodiments, the instructions, when executed, may cause the processor 104 embedded within the AWSMGM 406 or the AWSMGD 402 to perform the following: calculating a quality score value which aggregates service quality attribute scores for the selected architecture type, its underlying layers, and all underlying products or components.

According to exemplary embodiments, the instructions, when executed, may cause the processor 104 embedded within the AWSMGM 406 or the AWSMGD 402 to perform the following: assigning corresponding weightage value to each of the base score value, the technology score value, and the quality score value; calculating an overall score value by combining the weightage value of each of the base score value, the technology score value, and the quality score value; and generating the architecture weighted scoring model (AWSM) based on the calculated overall score value.

According to exemplary embodiments, the instructions, when executed, may cause the processor 104 embedded within the AWSMGM 406 or the AWSMGD 402 to perform the following: approving the application when it is determined that the overall score value is equal to or more than a predefined threshold value.

According to exemplary embodiments, the instructions, when executed, may cause the processor 104 embedded within the AWSMGM 406 or the AWSMGD 402 to perform the following: denying approval of the application when it is determined that the overall score value is less than a predefined threshold value; and automatically prompting an electronic notification on the GUI to review the selected architecture type again and/or setting up a meeting with an architecture consultant.

According to exemplary embodiments as disclosed above in FIGS. 1-10, technical improvements effected by the instant disclosure may include platforms for implementing an AWSMGM for generating an architecture weighted scoring model (AWSM) that allows product/software/application owners to choose the right architecture and the right underlying software components based on their use case and financial budget, thereby improving efficiency, quality, and productivity in designing and developing an application, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating an architecture weighted scoring model by utilizing one or more processors and one or more memories, the method comprising:
   receiving a request from a user computing device to develop an application;
   displaying a set of questions onto a graphical user interface (GUI) based on the received request, wherein the questions are designed to gather information about the application to be developed by the user;
   receiving user input data on each answer to the set of questions;
   determining an architecture type suitable for developing the application by utilizing a first decision tree running on backend on the GUI based on the received user input data;
   selecting the architecture type by the user;
   generating a second decision tree based on the user's selected architecture type, wherein the second decision tree constitutes a list of selectable underlying architecture layers corresponding to the selected architecture type;
   generating a third decision tree based on the user's selected architecture layers, wherein the third decision tree constitutes a curated list of selectable product offerings for each of the architecture layers;
   calculating a score for the selected architecture type based on analyzing aggregated information collected from data generated in response to user's answers and corresponding user's selection of each decision tree;
   calculating base score values for the selected architecture type, wherein the base score values include an application type value and a deployment strategy value, wherein the application type value is determined based on the user's inputs and the user's design considerations, and wherein the deployment strategy value is determined either explicitly by the user, or implicitly by the decision trees;
   calculating technology score values, wherein the technology score values include cross cutting concerns values and appropriate technology value, wherein the cross cutting concerns values are utilized to determine whether the selected architecture type adheres to organizational standards/conventions, and wherein the appropriate technology value is utilized to determine whether or not the selected architecture type and its underlying layers and product offerings adhere to an expected product lifecycle;
   calculating a quality score value which aggregates service quality attribute scores for the selected architecture type, its underlying layers, and all underlying products or components;
   running a checking algorithm on the selected architecture works; and
   generating an architecture weighted scoring model (AWSM) based on the calculated score and a positive checking result.

2. The method according to claim 1, wherein the AWSM includes details of different scores and their contributing factors in developing the application.

3. The method according to claim 1, further comprising:
   assigning corresponding weightage value to each of the base score value, the technology score value, and the quality score value;
   calculating an overall score value by combining the weightage value of each of the base score value, the technology score value, and the quality score value; and
   generating the AWSM based on the calculated overall score value.

4. The method according to claim 3, further comprising:
   approving the application when it is determined that the overall score value is equal to or more than a predefined threshold value.

5. The method according to claim 3, further comprising:
   denying approval of the application when it is determined that the overall score value is less than a predefined threshold value; and
   automatically prompting an electronic notification on the GUI to review the selected architecture type again and/or setting up a meeting with an architecture consultant.

6. A system for generating an architecture weighted scoring model, comprising:
   a receiver that receives a request from a user computing device to develop an application; and
   a processor operatively connected to the receiver via a communication network, wherein the processor is configured to:
   cause a graphical user interface (GUI) of the user computing device to display a set of questions based on the received request, wherein the questions are designed to gather information about the application to be developed by the user;
   receive user input data on each answer to the set of questions;
   determine an architecture type suitable for developing the application by utilizing a first decision tree running on backend on the GUI based on the received user input data;
   select the architecture type by the user;
   generate a second decision tree based on the user's selected architecture type, wherein the second decision tree constitutes a list of selectable underlying architecture layers corresponding to the selected architecture type;
   generate a third decision tree based on the user's selected architecture layers, wherein the third decision tree constitutes a curated list of selectable product offerings for each of the architecture layers;
   calculate a score for the selected architecture type based on analyzing aggregated information collected from data generated in response to user's answers and corresponding user's selection of each decision tree;

calculate base score values for the selected architecture type, wherein the base score values include an application type value and a deployment strategy value, wherein the application type value is determined based on the user's inputs and the user's design considerations, and wherein the deployment strategy value is determined either explicitly by the user, or implicitly by the decision trees;

calculate technology score values, wherein the technology score values include cross cutting concerns values and appropriate technology value, wherein the cross cutting concerns values are utilized to determine whether the selected architecture type adheres to organizational standards/conventions, and wherein the appropriate technology value is utilized to determine whether or not the selected architecture type and its underlying layers and product offerings adhere to an expected product lifecycle;

calculate a quality score value which aggregates service quality attribute scores for the selected architecture type, its underlying layers, and all underlying products or components;

run a checking algorithm on the selected architecture works; and generate an architecture weighted scoring model (AWSM) based on the calculated score and a positive checking result.

7. The system according to claim 6, wherein the AWSM includes details of different scores and their contributing factors in developing the application.

8. The system according to claim 6, wherein the processor is further configured to:

assign corresponding weightage value to each of the base score value, the technology score value, and the quality score value;

calculate an overall score value by combining the weightage value of each of the base score value, the technology score value, and the quality score value; and generate the AWSM based on the calculated overall score value.

9. The system according to claim 8, wherein the processor is further configured to:

approve the application when it is determined that the overall score value is equal to or more than a predefined threshold value.

10. The system according to claim 8, wherein the processor is further configured to:

deny approval of the application when it is determined that the overall score value is less than a predefined threshold value; and automatically prompt an electronic notification on the GUI to review the selected architecture type again and/or setting up a meeting with an architecture consultant.

11. A non-transitory computer readable medium configured to store instructions for generating an architecture weighted scoring model, wherein, when executed, the instructions cause a processor to perform the following:

causing a receiver to receive a request from a user computing device to develop an application;

causing a graphical user interface (GUI) to display a set of questions based on the received request, wherein the questions are designed to gather information about the application to be developed by the user;

receiving user input data on each answer to the set of questions;

determining an architecture type suitable for developing the application by utilizing a first decision tree running on backend on the GUI based on the received user input data;

selecting the architecture type by the user;

generating a second decision tree based on the user's selected architecture type, wherein the second decision tree constitutes a list of selectable underlying architecture layers corresponding to the selected architecture type;

generating a third decision tree based on the user's selected architecture layers, wherein the third decision tree constitutes a curated list of selectable product offerings for each of the architecture layers;

calculating a score for the selected architecture type based on analyzing aggregated information collected from data generated in response to user's answers and corresponding user's selection of each decision tree;

calculating base score values for the selected architecture type, wherein the base score values include an application type value and a deployment strategy value, wherein the application type value is determined based on the user's inputs and the user's design considerations, and wherein the deployment strategy value is determined either explicitly by the user, or implicitly by the decision trees;

calculating technology score values, wherein the technology score values include cross cutting concerns values and appropriate technology value, wherein the cross cutting concerns values are utilized to determine whether the selected architecture type adheres to organizational standards/conventions, and wherein the appropriate technology value is utilized to determine whether or not the selected architecture type and its underlying layers and product offerings adhere to an expected product lifecycle;

calculating a quality score value which aggregates service quality attribute scores for the selected architecture type, its underlying layers, and all underlying products or components;

running a checking algorithm on the selected architecture works; and generating an architecture weighted scoring model (AWSM) based on the calculated score and a positive checking result.

12. The non-transitory computer readable medium according to claim 11, wherein the AWSM includes details of different scores and their contributing factors in developing the application.

13. The non-transitory computer readable medium according to claim 11, wherein, when executed, the instructions cause the processor to perform the following:

assigning corresponding weightage value to each of the base score value, the technology score value, and the quality score value;

calculating an overall score value by combining the weightage value of each of the base score value, the technology score value, and the quality score value; and generating the AWSM based on the calculated overall score value.

14. The non-transitory computer readable medium according to claim 11, wherein, when executed, the instructions cause the processor to perform the following:

approving the application when it is determined that the overall score value is equal to or more than a predefined threshold value.

15. The non-transitory computer readable medium according to claim 11, wherein, when executed, the instructions cause the processor to perform the following:
  denying approval of the application when it is determined that the overall score value is less than a predefined threshold value; and
  automatically prompting an electronic notification on the GUI to review the selected architecture type again and/or setting up a meeting with an architecture consultant.

* * * * *